US012791148B2

(12) United States Patent
Lamarre et al.

(10) Patent No.: US 12,791,148 B2
(45) Date of Patent: Nov. 10, 2026

(54) LUBRICANT SYSTEM FOR AIRCRAFT

(71) Applicant: Pratt & Whitney Canada Corp., Longueuil (CA)

(72) Inventors: Sylvain Lamarre, Boucherville (CA); Genevieve McMurray, Mont St-Hilaire (CA); Thibaut Edmond J. Duchene, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 19/046,821

(22) Filed: Feb. 6, 2025

(65) Prior Publication Data

US 2026/0227029 A1 Aug. 6, 2026

(51) Int. Cl.
*F16N 7/40* (2006.01)
*B64D 33/00* (2006.01)

(52) U.S. Cl.
CPC ............... *F16N 7/40* (2013.01); *B64D 33/00* (2013.01); *F16N 2210/08* (2013.01); *F16N 2270/70* (2013.01)

(58) Field of Classification Search
CPC .... F16N 7/40; F16N 2210/08; F16N 2270/70; B64D 33/00
See application file for complete search history.

(56) References Cited

U.S. PATENT DOCUMENTS

| | | | | |
|---|---|---|---|---|
| 6,793,042 | B2 | 9/2004 | Brouillet | |
| 8,985,278 | B2 * | 3/2015 | Xu | F01D 25/20 184/6.11 |
| 9,410,448 | B2 * | 8/2016 | Sheridan | F01M 11/067 |
| 9,506,476 | B2 * | 11/2016 | Homeyer | F16N 7/40 |
| 9,765,643 | B2 | 9/2017 | Stutz et al. | |
| 9,765,875 | B2 * | 9/2017 | Sheridan | F16H 57/045 |
| 9,909,453 | B2 * | 3/2018 | Fang | F01M 5/002 |
| 10,107,142 | B2 * | 10/2018 | Mastro | F02C 7/36 |
| 10,711,644 | B2 * | 7/2020 | Avis | F16N 7/40 |
| 10,961,868 | B2 * | 3/2021 | Avis | F16N 7/40 |
| 11,078,936 | B2 * | 8/2021 | Adamson | B64F 5/40 |
| 11,306,813 | B2 * | 4/2022 | Mueller | F16H 57/0486 |
| 11,391,363 | B2 * | 7/2022 | Sbabo | F16H 57/0445 |

(Continued)

FOREIGN PATENT DOCUMENTS

| | | | |
|---|---|---|---|
| CN | 117605574 | A | 2/2024 |
| CN | 118188168 | A | 6/2024 |
| FR | 3020093 | B1 | 5/2018 |

OTHER PUBLICATIONS

Search Report issued in European Patent Application No. 26156911.5; Date of Mailing Jun. 10, 2026 (10 pages).

*Primary Examiner* — Henry Y Liu
(74) *Attorney, Agent, or Firm* — CANTOR COLBURN LLP

(57) ABSTRACT

A powerplant of an aircraft is provided and includes a primary tank fluidly connected to a motor via a lubrication circuit that is operable to provide lubricant to a part of the motor when the aircraft is in use, the primary tank having pre-defined maximum and minimum lubricant levels, a secondary tank disposed relative to the primary tank such that a portion of the secondary tank is disposed height-wise between the maximum level and the minimum level of the primary tank when the aircraft is stationary on horizontal terrain and air and lubricant conduits.

20 Claims, 8 Drawing Sheets

(56) References Cited

U.S. PATENT DOCUMENTS

| | | | | |
|---|---|---|---|---|
| 11,542,845 | B2 * | 1/2023 | Tomescu | F01M 1/02 |
| 11,555,418 | B2 * | 1/2023 | Younes | F01D 25/20 |
| 11,639,771 | B2 * | 5/2023 | Molla | C10M 175/0091 184/7.4 |
| 11,964,779 | B2 * | 4/2024 | Santin | B64F 5/40 |
| 12,098,674 | B2 * | 9/2024 | Balbo | F01D 25/20 |
| 2011/0297485 | A1 * | 12/2011 | Sheridan | F16N 17/06 184/6.12 |
| 2014/0069743 | A1 * | 3/2014 | Xu | F01D 25/18 184/6.11 |
| 2014/0124297 | A1 * | 5/2014 | Motto | F01D 25/20 184/6.12 |
| 2016/0215652 | A1 * | 7/2016 | Mastro | F16H 57/0441 |
| 2016/0341074 | A1 * | 11/2016 | Fang | F01D 25/18 |
| 2016/0369887 | A1 * | 12/2016 | Sheridan | F16H 57/045 |
| 2017/0138217 | A1 * | 5/2017 | Schwarz | F01D 21/10 |
| 2018/0306062 | A1 * | 10/2018 | Avis | F01M 1/02 |
| 2020/0277878 | A1 * | 9/2020 | Avis | F01M 1/02 |
| 2020/0340574 | A1 * | 10/2020 | Sbabo | F01D 25/20 |
| 2021/0116015 | A1 * | 4/2021 | Mueller | F16H 57/0482 |
| 2021/0131321 | A1 * | 5/2021 | Tomescu | F16N 7/40 |

* cited by examiner

LUBRICANT SYSTEM FOR AIRCRAFT

BACKGROUND

The present disclosure relates to lubricant systems for gas turbine engines of aircrafts for example and, in particular, to a lubricant system for a gas turbine engine of an aircraft.

In a gas turbine engine, it is often important to be able to supply lubricant to certain components and assemblies. The lubricant that is supplied may be used as a lubricant to reduce friction between mating parts, as a coolant in a heat exchanger and/or in various other similar applications. The lubricant is contained within a lubricant tank and can be introduced into the engine or whatever other system it is to be used for. After the lubricant is introduced into the engine/system, the lubricant may be scavenged, filtered and cooled before the lubricant is re-introduced into the engine/system.

SUMMARY

According to an aspect of the disclosure, a powerplant of an aircraft is provided and includes a motor, a primary tank fluidly connected to the motor via a lubrication circuit that is operable to provide lubricant to a part of the motor when the aircraft is in use, the primary tank having pre-defined maximum and minimum lubricant levels, a secondary tank disposed relative to the primary tank such that a portion of the secondary tank is disposed height-wise between the maximum level and the minimum level of the primary tank when the aircraft is stationary on horizontal terrain and air and lubricant conduits. The air conduit fluidly connects into the primary tank at a location on the primary tank that extends height-wise above the maximum level of the primary tank when the aircraft is stationary on horizontal terrain and into the secondary tank at a location on the secondary tank that height-wise extends above the maximum level of the primary tank when the aircraft is stationary on horizontal terrain. The lubricant conduit fluidly connects into the primary tank at a location on the primary tank that height-wise extends below the minimum level of the primary tank when the aircraft is stationary on horizontal terrain and into the secondary tank at a location on the secondary tank that height-wise extends below the minimum level of the primary tank when the aircraft is stationary on horizontal terrain.

In accordance with one or more additional and/or alternative embodiments, the location at which the air conduit connects into the primary tank is one of a sight glass location of the primary tank and a lubricant filler neck location of the primary tank.

In accordance with one or more additional and/or alternative embodiments, the location at which the lubricant conduit connects into the primary tank is one of the sight glass location of the primary tank and a drain port location of the primary tank.

In accordance with one or more additional and/or alternative embodiments, the location at which the lubricant conduit connects into the primary tank or the secondary tank comprises a "T" fitting.

In accordance with one or more additional and/or alternative embodiments, an air vent is provided in each of the primary and secondary tanks.

In accordance with one or more additional and/or alternative embodiments, the air vent includes a connection to atmosphere.

In accordance with one or more additional and/or alternative embodiments, the motor includes one of: a gas turbine engine, an electric motor, and a rotary engine.

In accordance with one or more additional and/or alternative embodiments, the air conduit and its connections are structured to equalize air pressure between the primary and secondary tanks during operation of the aircraft.

In accordance with one or more additional and/or alternative embodiments, the lubricant conduit and its connections are structured to allow for a rate of flow of lubricant from the secondary tank to the primary tank during operation of the aircraft which is at least equal to a rate of consumption of lubricant by the motor from the primary tank during operation of the aircraft.

In accordance with one or more additional and/or alternative embodiments, the primary tank is integrated into a structure of the motor and the secondary tank is mounted to one of: the motor and a nacelle that extends around the motor.

In accordance with one or more additional and/or alternative embodiments, the aircraft and motor were manufactured for a maximum flight range based on a volume of the primary tank, an additional flight range was assigned to the aircraft and motor and the secondary tank is sized based on a rate of consumption of lubricant by the motor from the primary tank during operation of the aircraft, and the additional flight range to enable the aircraft to fly a sum of the maximum flight range and the additional flight range once the primary and secondary tanks are filled with lubricant to the maximum level without adding lubricant to the primary or secondary tank before completing the sum of the maximum flight range and the additional flight range.

In accordance with one or more additional and/or alternative embodiments, the secondary tank is sized to enable the aircraft to fly the sum of the maximum flight range and the additional flight range by having had its volume located height-wise between the minimum level and the maximum level sized based on the rate of consumption of lubricant by the motor from the primary tank during operation of the aircraft and the additional flight range.

According to an aspect of the disclosure, an aircraft motor assembly is provided and includes a nacelle connected to the aircraft motor and a lubricant system providing the aircraft motor with a desired range and including a primary tank having maximum and minimum levels and containing, to the maximum level, lubricant for the engine such that the vehicle has a first range, a secondary tank disposed in space in one of the engine and the nacelle and containing additional lubricant at or below the maximum level and at or above the minimum level and a fluid connection between the secondary and the primary tanks to maintain substantially equal lubricant levels in the primary and secondary tanks.

In accordance with one or more additional and/or alternative embodiments, the fluid connection includes a lubricant conduit and an air conduit.

In accordance with one or more additional and/or alternative embodiments, the fluid connection includes an air vent in each of the primary and secondary tanks.

In accordance with one or more additional and/or alternative embodiments, the air vent includes a connection to atmosphere.

According to an aspect of the disclosure, a method of retrofitting an aircraft to provide the aircraft with an additional flight range is provided. The method includes determining, for a primary lubricant tank of a powerplant of the aircraft, maximum and minimum lubricant levels of the primary lubricant tank, determining a rate of lubricant consumption of the powerplant when the aircraft is in use, determining, based on the rate of lubricant consumption and the additional flight range, a volume of additional lubricant required to enable the aircraft to fly a sum of an original flight range and the additional flight range, sizing a secondary lubricant tank to provide the volume of additional lubricant height-wise in between the maximum and minimum lubricant levels of the primary lubricant tank when the secondary lubricant tank is installed on the aircraft, installing the secondary lubricant tank on the aircraft such that the secondary lubricant tank provides the volume of additional lubricant at a location that is height-wise in between the maximum and minimum lubricant levels of the primary lubricant tank, fluidly connecting the secondary lubricant tank to the primary lubricant tank such that a level of lubricant in the secondary lubricant tank tracks a level of lubricant in the primary lubricant tank while the level of lubricant in the primary lubricant tank is between the maximum and minimum lubricant levels of the primary lubricant tank during operation of the aircraft and structuring the primary and secondary lubricant tanks such that air pressure in the primary and secondary lubricant tanks is substantially the same when the aircraft is stationary on horizontal ground.

In accordance with one or more additional and/or alternative embodiments, the fluidly connecting of the secondary lubricant tank to the primary lubricant tank includes removing a sight glass from a sight glass location of the primary lubricant tank and fluidly connecting the secondary lubricant tank to the primary lubricant tank via the sight glass location.

In accordance with one or more additional and/or alternative embodiments, the fluidly connecting of the secondary lubricant tank to the primary lubricant tank includes fluidly connecting the secondary lubricant tank to the primary lubricant tank via a filler neck of the primary lubricant tank.

In accordance with one or more additional and/or alternative embodiments, the structuring the primary and secondary lubricant tanks such that air pressure in the primary and secondary lubricant tanks is substantially the same when the aircraft is stationary on horizontal ground includes venting the primary and secondary lubricant tanks to atmosphere.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

The following disclosure is applicable to any type of gas turbine engine, including, but not limited to, turbofans, turboshafts, turboprops, turbojets, electrical drives, hybrid drives, etc. The gas turbine engine described below is provided by way of example, and should not be interpreted as limiting the scope of the application or the claims in any way.

Figure 1:
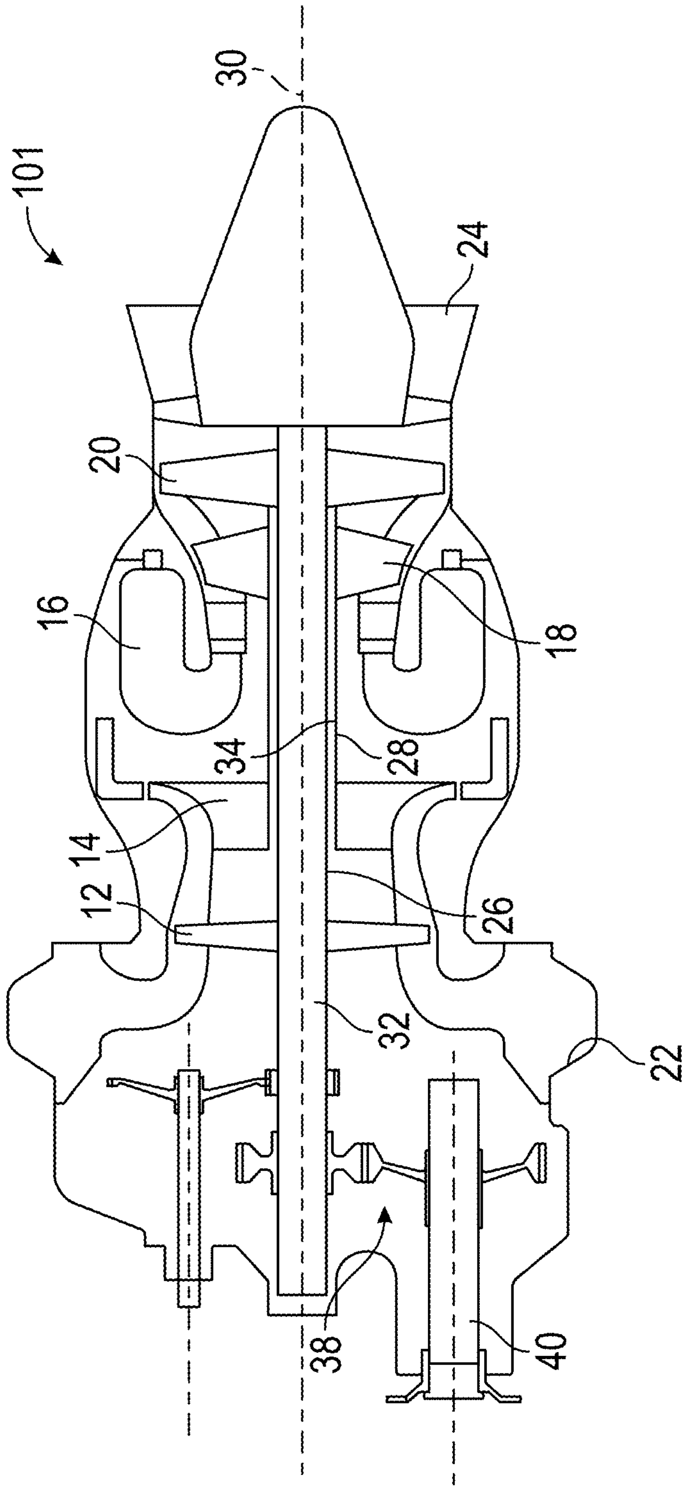
FIG. 1 (PRIOR ART)
FIG. 1 is a cross-sectional view of a prior art turboshaft engine

With reference to FIG. 1, a turboshaft engine 101 is provided and configured as a gas turbine engine. In particular, the turboshaft engine 101 is a generally conventional turboshaft engine generally including, in serial flow communication, a low pressure (LP) compressor section 12 and a high pressure (HP) compressor section 14 for pressurizing air, a combustor 16 in which the compressed air is mixed with fuel and ignited for generating an annular stream of hot combustion gases, a high pressure turbine section 18 for extracting energy from the combustion gases and driving the high pressure compressor section 14 and a lower pressure turbine section 20 for further extracting energy from the combustion gases and driving at least the low pressure compressor section 12.

The low pressure compressor section 12 may independently rotate from the high pressure compressor section 14. The low pressure compressor section 12 may include one or more compression stages and the high pressure compressor section 14 may include one or more compression stages. A compressor stage may include a compressor rotor, or a combination of the compressor rotor and a compressor stator assembly. In a multistage compressor configuration, the compressor stator assemblies may direct the air from one compressor rotor to the next.

The turboshaft engine 101 has multiple, i.e. two or more, spools which may perform the compression to pressurize the air received through an air inlet 22, and which extract energy from the combustion gases before they exit via an exhaust outlet 24. For example, the turboshaft engine 101 can include a low pressure spool 26 and a high pressure spool 28 mounted for rotation about an engine axis 30. The low pressure and high pressure spools 26, 28 are independently rotatable relative to each other about the axis 30. The term “spool” is herein intended to broadly refer to drivingly connected turbine and compressor rotors.

The low pressure spool 26 includes a low pressure shaft 32 interconnecting the low pressure turbine section 20 with the low pressure compressor section 12 to drive rotors of the low pressure compressor section 12. In other words, the low pressure compressor section 12 may include at least one low pressure compressor rotor directly drivingly engaged to the low pressure shaft 32 and the low pressure turbine section 20 may include at least one low pressure turbine rotor directly drivingly engaged to the low pressure shaft 32 so as to rotate the low pressure compressor section 12 at a same speed as the low pressure turbine section 20. The high pressure spool 28 includes a high pressure shaft 34 interconnecting the high pressure turbine section 18 with the high pressure compressor section 14 to drive rotors of the high pressure compressor section 14. In other words, the high pressure compressor section 14 may include at least one high pressure compressor rotor directly drivingly engaged to the high pressure shaft 34 and the high pressure turbine section 18 may include at least one high pressure turbine rotor directly drivingly engaged to the high pressure shaft 34 so as to rotate the high pressure compressor section 14 at a same speed as the high pressure turbine section 18. In some embodiments, the high pressure shaft 34 may be hollow and the low pressure shaft 32 extends therethrough. The two shafts 32, 34 are free to rotate independently from one another.

The turboshaft engine 101 may further include a transmission 38 driven by the low pressure shaft 32 and driving a rotatable output shaft 40. The transmission 38 may vary a ratio between rotational speeds of the low pressure shaft 32 and the output shaft 40.

A lubricant tank for the turboshaft engine 101 is often located within the turboshaft engine 101 and often only capable of storing a set volume of lubricant that can allow for engine operation for only a certain number of hours, such as between 8-10 hours, for example. Certain missions, however, such as ferry flights, may last longer than that. Such missions include occasional flights where an aircraft needs to be moved to a maintenance facility, delivered to a customer, etc.

A need therefore exists for a lubricant system that allows an aircraft to remain flying for an extended period of time, rather than having to land to refill the lubricant tank during long journeys.

Thus, as will be described below, an external lubricant tank system that can be installed to the engine or to an engine nacelle is proposed. The external lubricant tank system would be in addition to the existing lubricant tank of the engine and avoid the needs to replace the lubricant tank with a larger one in order to obtain higher range flight capabilities.

Figure 2:
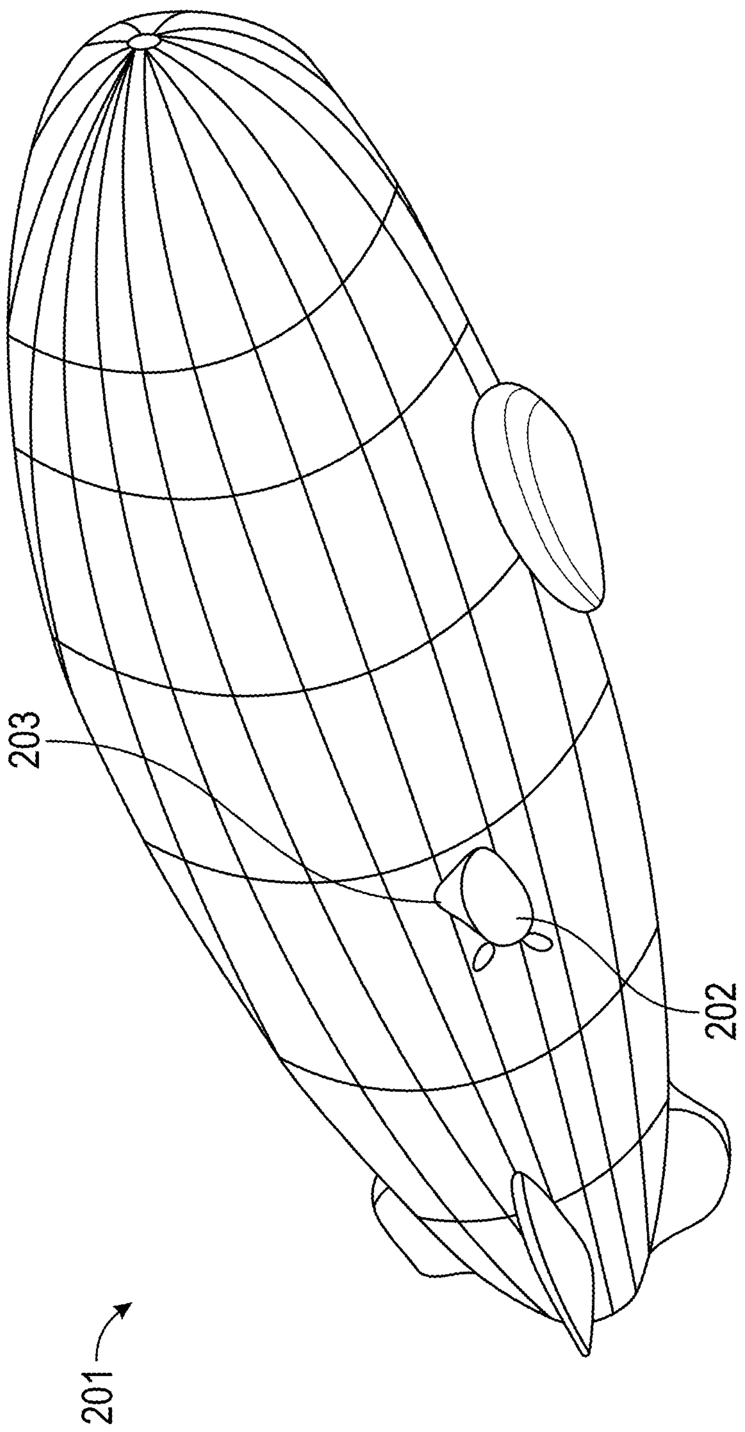
FIG. 2 is a perspective view of an airship in accordance with embodiments.
Figure 3:
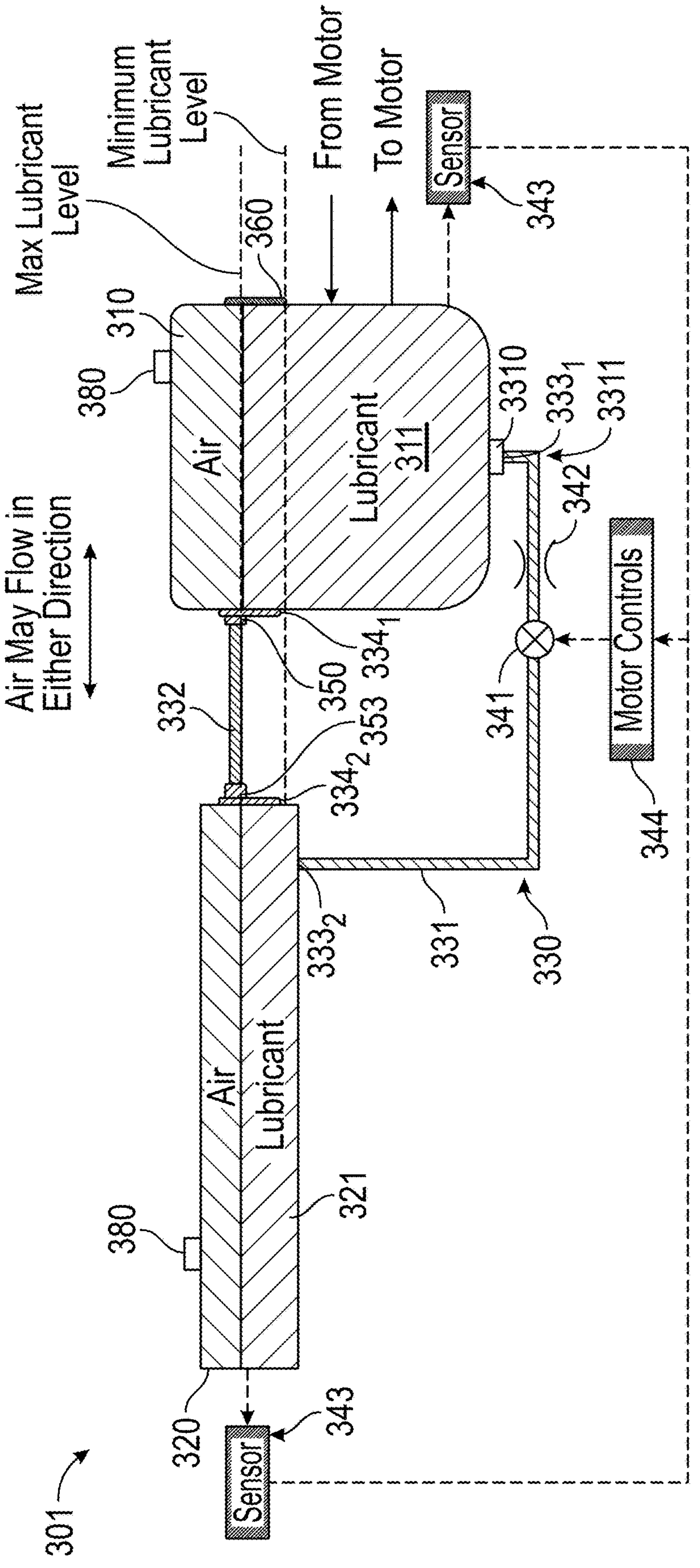
FIG. 3 is a schematic diagram of a lubrication system including an optional control system with a primary lubricant tank and an external lubricant tank in accordance with embodiments.

With reference to FIGS. 2 and 3, a powerplant 301 (see FIG. 3) of a vehicle is provided. The vehicle can be any type of ground-based vehicle, nautical vehicle or an aircraft. For purposes of clarity and brevity, the following description will relate to the case of the vehicle being an aircraft, such as aircraft 201 of FIG. 2.

The powerplant 301 provides the aircraft 201 with a desired range. The aircraft 201 can be provided as an airship as shown in FIG. 2 with a motor 202, such as a gas turbine engine, an electric motor, a rotary engine and the turboshaft engine 101 of FIG. 1, and an engine nacelle 203. As shown in FIG. 3, the powerplant 301 includes a primary lubricant tank 310, a secondary lubricant tank 320 and a fluid circuit 330. The primary lubricant tank 310 is fluidly connected to the motor 202 via a lubrication circuit that is operable to provide lubricant to a part of the motor 202 when the aircraft 201 is in use. The primary lubricant tank 310 has a predefined maximum lubricant level and a predefined minimum lubricant level. The primary lubricant tank 310 is formed to define a first interior 311 that contains lubricant for exchange with the motor 202 of FIG. 2 and air occupying a remainder of the first interior 311. The secondary lubricant tank 320 is disposed relative to the primary lubricant tank 310 such that a portion of the secondary lubricant tank 320 is disposed height-wise between the maximum lubricant level and the minimum lubricant level when the aircraft 201 is stationary on horizontal terrain. The secondary lubricant tank 320 is formed to define a second interior 321 that contains lubricant and air occupying a remainder of the second interior 321.

The aircraft 201 and the motor 202 can be manufactured for a maximum flight range based on a volume of the primary lubricant tank 310 and an additional flight range can be assigned to the aircraft 201 and the motor 202. In these or other cases, the secondary lubricant tank 320 can be sized based on a rate of consumption of lubricant by the motor 202 from the primary lubricant tank during operation of the aircraft 201. The additional flight range serves to enable the aircraft to fly a sum of the maximum flight range and the additional flight range once the primary lubricant tank 310 and the secondary lubricant tank 320 are filled with lubricant to the maximum lubricant level of the primary lubricant tank 310 without adding lubricant to the primary lubricant tank 310 or to the secondary lubricant tank 320 before completing the sum of the maximum flight range and the additional flight range.

The fluid circuit 330 includes separate lines for lubricant and air flows between the secondary lubricant tank 320 and the primary lubricant tank 310 to maintain equalized pressures therein. Thus, with the motor 202 of FIG. 2 consuming the lubricant, the primary lubricant tank 310 receives lubricant from the secondary lubricant tank 320 via the fluid circuit 330. This lubricant from the secondary lubricant tank 320 is sufficient to provide the aircraft 201 with the additional flight range.

The separate lines of the fluid circuit 330 can include a lubricant conduit 331 and an air conduit 332.

The lubricant conduit 331 fluidly connects into the primary lubricant tank 310 at a location 3331 on the primary lubricant tank 310 that height-wise extends below the minimum lubricant level of the primary lubricant tank 310 when the aircraft 201 is stationary on horizontal terrain and fluidly connects into the secondary lubricant tank 320 at a location 3332 on the secondary lubricant tank 320 that height-wise extends below the minimum lubricant level of the primary lubricant tank 310 when the aircraft 201 is stationary on horizontal terrain. Thus, the lubricant conduit 331 and the connections at locations 3331 and 3332 are structured and configured to allow for a rate of flow of lubricant from the secondary lubricant tank 320 to the primary lubricant tank 310 during operation of the aircraft 201, with the rate of the flow of lubricant being at least equal to a rate of consumption of lubricant by the motor 202 from the primary lubricant tank 210 during operation of the aircraft 202.

The air conduit 332 fluidly connects into the primary lubricant tank 320 at a location 3341 on the primary lubricant tank 310 that extends height-wise above the maximum lubricant level of the primary lubricant tank 310 when the aircraft 201 is stationary on horizontal terrain and fluidly connects into the secondary lubricant tank 320 at a location 3342 on the secondary lubricant tank 320 that height-wise extends above the maximum lubricant level of the primary lubricant tank 310 when the aircraft 201 is stationary on horizontal terrain. Thus, the air conduit 332 and the connections at locations 3341 and 3342 are configured and structured to equalize air pressure between the primary lubricant tank 310 and the secondary lubricant tank 320.

Figure 4:
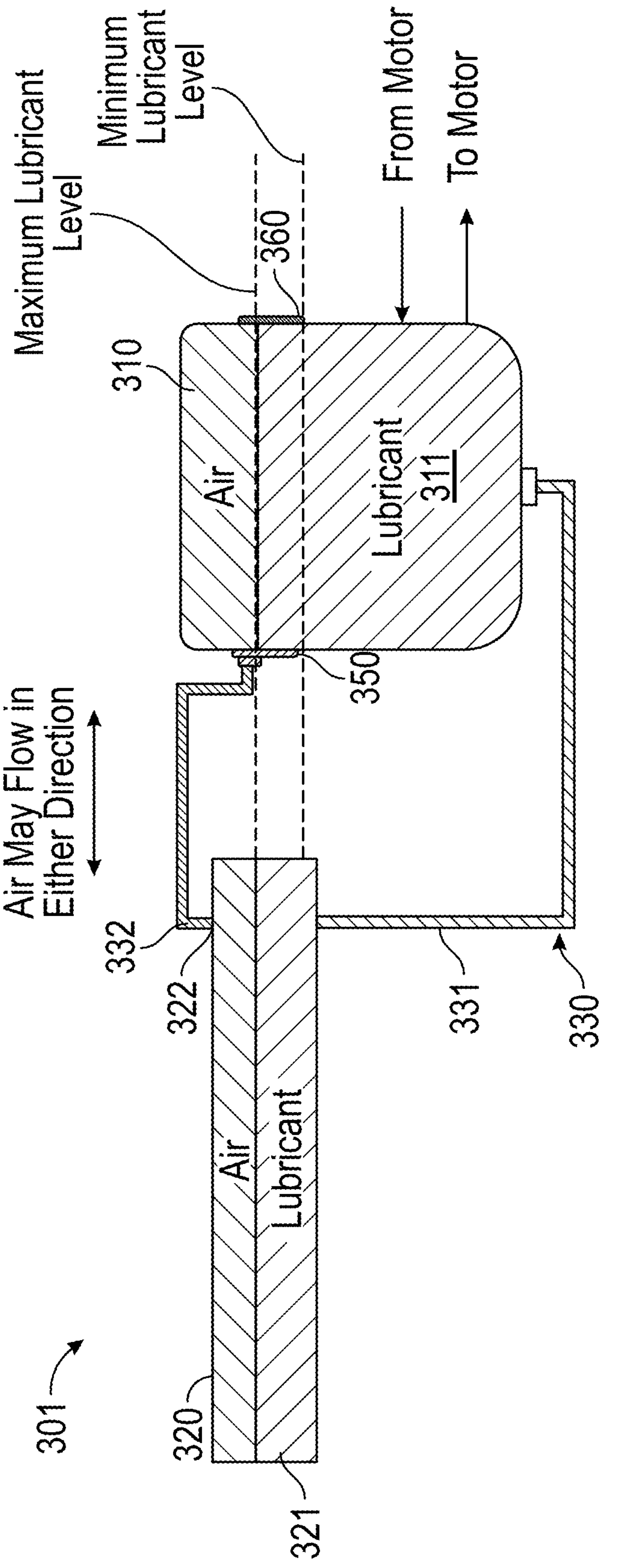
FIG. 4 is a schematic diagram of a lubrication system including separate lines for lubricant and air flows without active flow controls, such as control valves and sensors dedicated to the added range functionality, in accordance with embodiments.
Figure 5:
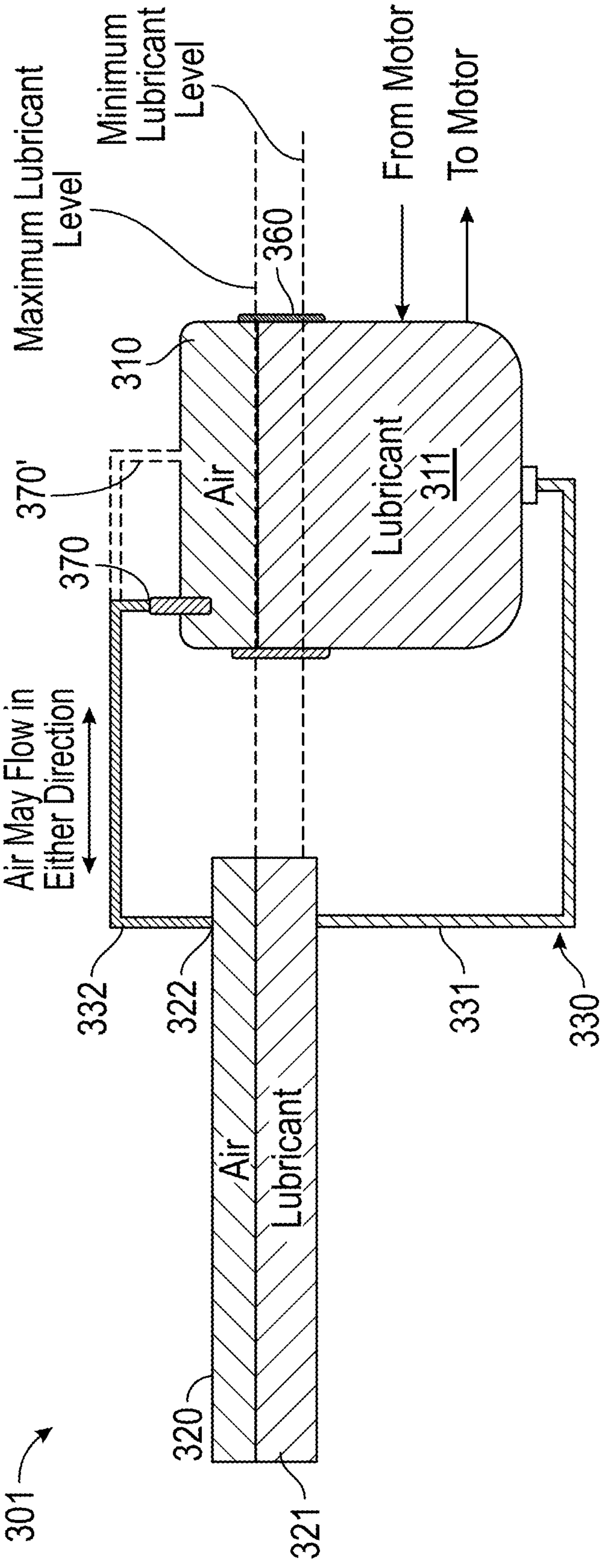
FIG. 5 is a schematic diagram of a lubrication system with a primary lubricant tank that receives air via a filler neck port and an external lubricant tank in accordance with embodiments.
Figure 6:
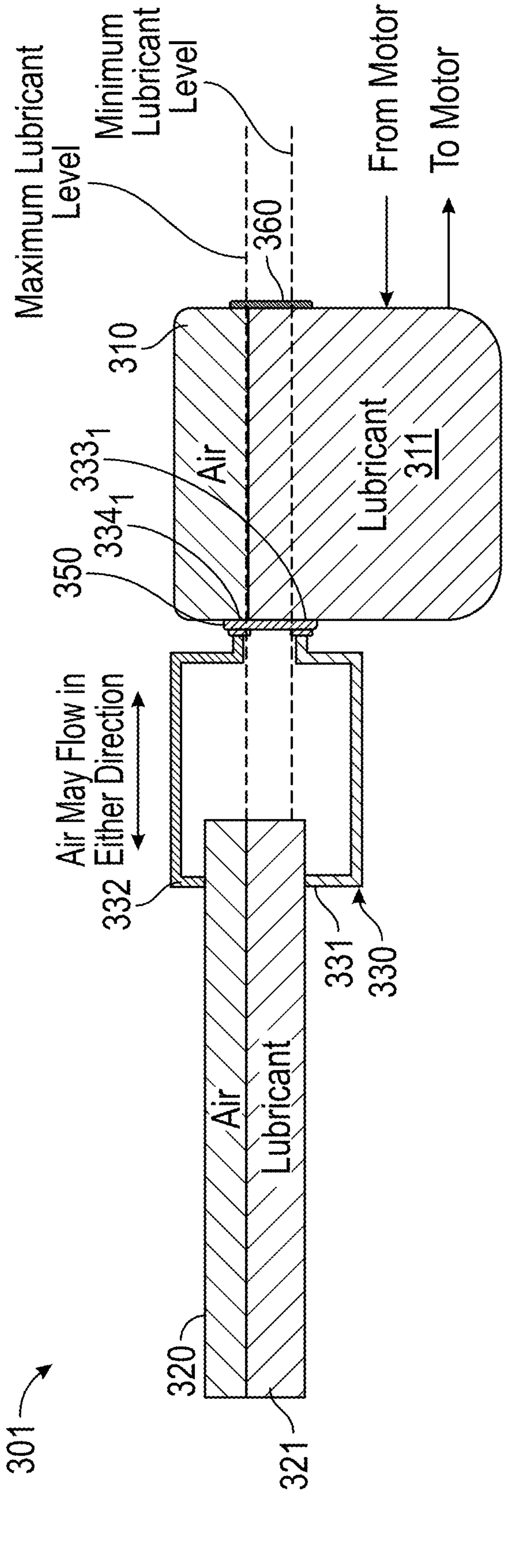
FIG. 6 is a schematic diagram of a lubrication system with a primary lubricant tank and an external lubricant tank in which ports are at or above a maximum lubricant level and at or below a minimum lubricant level in accordance with embodiments.

With continued reference to FIG. 3 and with additional reference to FIGS. 4-6, the location 3341 at which the air conduit 332 connects into the primary lubricant tank 320 can be one of a sight glass location 350 (the primary lubricant tank 310 can include additional sight glass features 360) of the primary lubricant tank 310 as shown in FIGS. 3, 4 and 6 and a modified or dedicated lubricant filler neck location 370, 370' of the primary lubricant tank 310 as shown in FIG. 5. Also, the location 3331 at which the lubricant conduit 331 connects into the primary lubricant tank 310 can be one of the sight glass location 350 of the primary lubricant tank 310 as shown in FIG. 6 and a drain port location 3310 of the primary lubricant tank 310 as shown in FIGS. 3-5. The location 3342 at which the air conduit 332 connects into the secondary lubricant tank 320 can be one of a sight glass location 353 (the secondary lubricant tank 320 can include additional sight glass features) of the secondary lubricant tank 320 as shown in FIG. 3 and a lubricant filler neck location 322 of the secondary lubricant tank 320 as shown in FIGS. 4-6. Also, the location 3332 at which the lubricant conduit 331 connects into the secondary lubricant tank 320 can be one of the sight glass location 353 of the secondary lubricant tank 320 and a drain port location of the secondary lubricant tank 320 as shown in FIGS. 3-6.

It is to be understood that, for both the primary lubricant tank 310 and the secondary lubricant tank 320, the connections at the locations 3331 and 3332 can each include or be provided as dedicated ports or as drain ports. In either case, one or both of the connections at the locations 3331 and 3332 may include a "T" fitting 3311 such that a drain function can be enabled. That is, with the "T" fitting 3311 on the primary lubricant tank 310 for example, a single pipe in the "T" fitting 3311 connects into the drain port location 3310, and one of the branched pipe connections is used for the lubricant conduit 331 and the other one of the branched pipe connections has a valve that can be opened to drain the primary lubricant tank 310.

With continued reference to FIG. 3, the powerplant 301 can optionally further include a servo valve 341 and a flow restrictor 342 respectively disposed in series along the lubricant conduit 331, a sensor system 343 deployed in the primary lubricant tank 310 and the secondary lubricant tank 320 to sense lubricant levels, lubricant flows and lubricant temperatures and a control system 344. The control system 344 is coupled to the servo valve 341, the flow restrictor 342 and the sensor system 343. The control system 344 is configured to control operations of the servo valve 341 and the flow restrictor 342 to adjust lubricant flows between the primary lubricant tank 310 and the secondary lubricant tank 320 in accordance with readings of the sensor system 343. As shown in FIG. 4 in particular, the lubricant conduit 331 and the air conduit 332 and the secondary lubricant tank 320 as described can be structured to provide the added range functionality described using gravity, i.e., without active flow controls such as those of FIG. 3.

Figure 7:
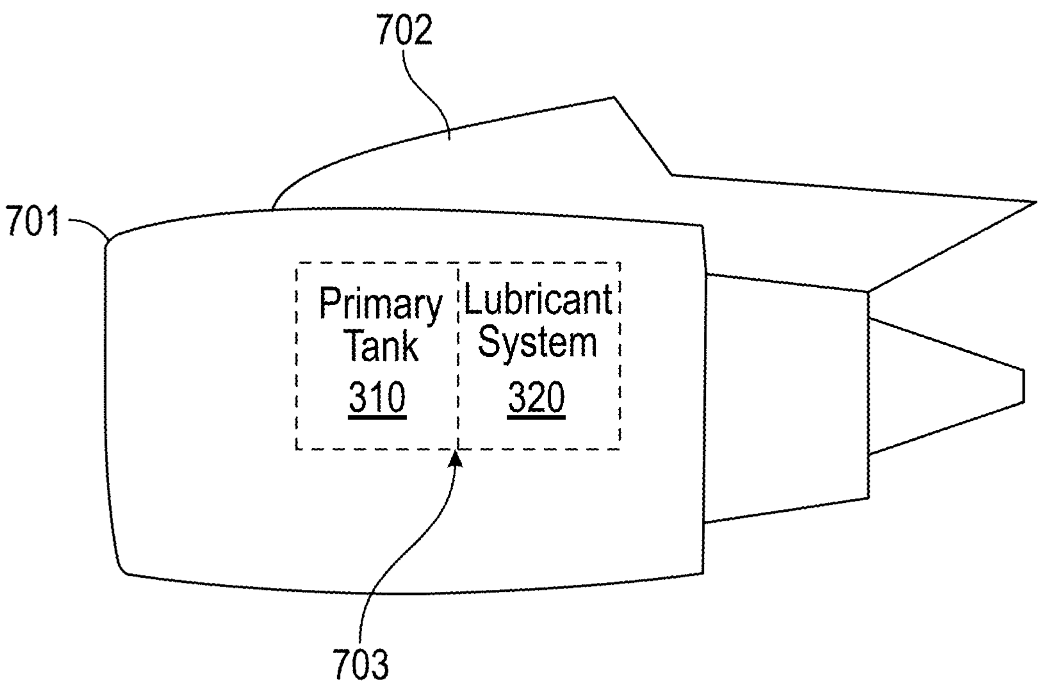
FIG. 7 is a schematic diagram of an aircraft engine with a lubrication system in accordance with embodiments.

With reference to FIG. 7, an aircraft motor assembly of the aircraft 201 of FIG. 2 can include, for example, a motor 701, such as the motor 202, to generate motive power for the aircraft 201, a nacelle 702 connected to and supporting the motor 701 on the aircraft 201 and a lubricant system 703, such as the powerplant 301 described above to provide the aircraft 201 with a desired range. That is, the lubricant system 703 includes a primary lubricant tank, a secondary lubricant tank and a fluid connection. The primary lubricant tank (i.e., the primary lubricant tank 310 described above) has maximum and minimum lubricant levels and contains, to the maximum lubricant level, lubricant for the motor 701 such that the aircraft 201 has a first range. The secondary tank (i.e., the secondary lubricant tank 320 described above) is disposed in space in one of the motor 701 and the nacelle 702 and contains additional lubricant at or below the maximum lubricant level and at or above the minimum lubricant level. The fluid connection (i.e., the lubricant conduit 331 and the air conduit 332 described above) is disposed between the secondary and the primary lubricant tanks to maintain substantially equal lubricant levels in the primary and secondary lubricant tanks.

With continued reference to FIG. 7 and with reference back to FIG. 3, the fluid connection can include the lubricant conduit 331 and the air conduit 332 of the powerplant 301 of FIG. 3 and an air vent 380 can be provided in each of the primary lubricant tank 310 and the secondary lubricant tank 320. The air vent 380 can include a connection 381 to atmosphere.

Figure 8:
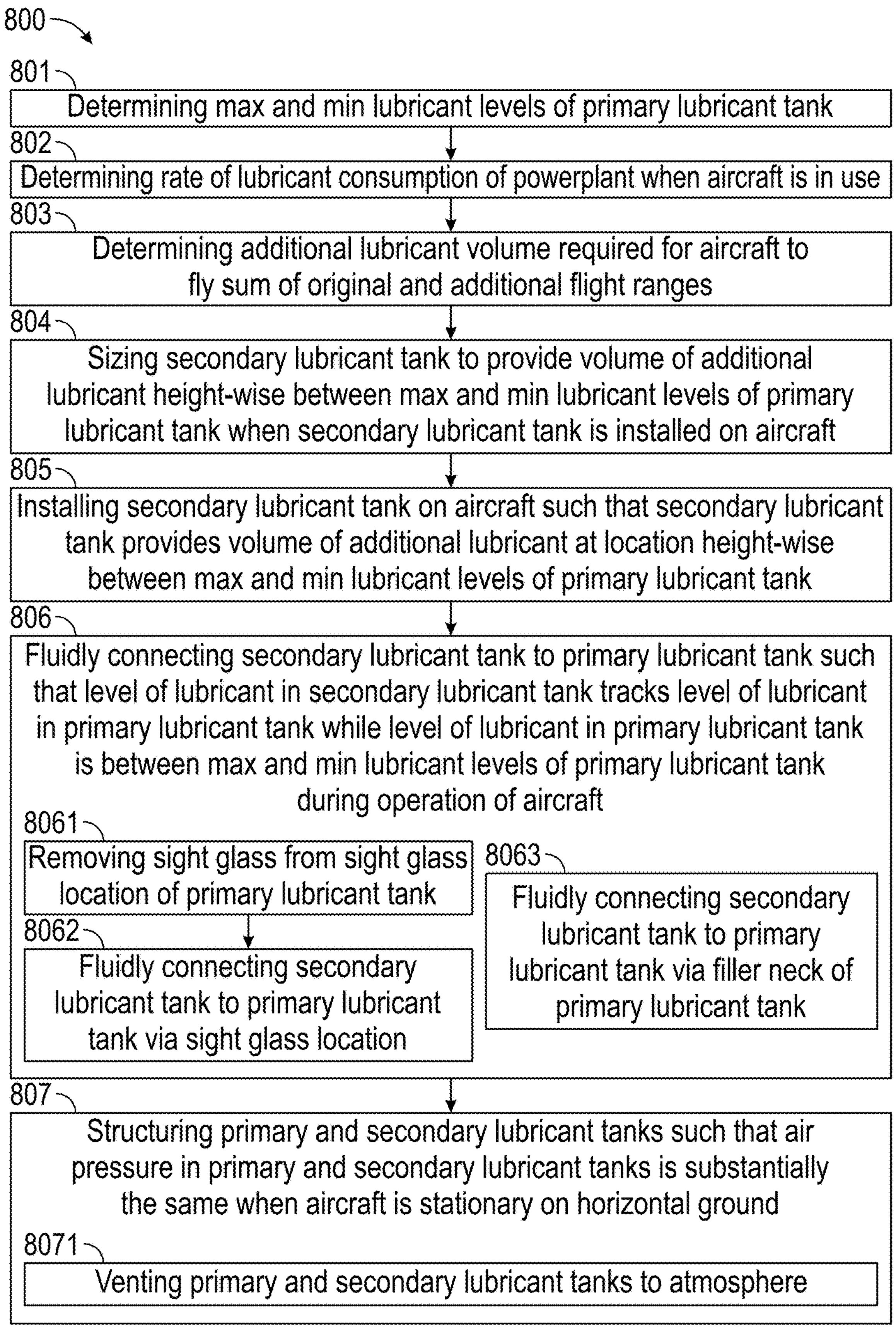
FIG. 8 is a flow diagram illustrating a method of retrofitting an aircraft to provide the aircraft with an additional flight range in accordance with embodiments.

With reference to FIG. 8, a method 800 of retrofitting an aircraft, such as the aircraft 201 described above, is provided to thereby provide the aircraft with an additional flight range. The method 800 includes determining, for a primary lubricant tank of a powerplant of the aircraft, maximum and minimum lubricant levels of the primary lubricant tank (block 801), determining a rate of lubricant consumption of the powerplant when the aircraft is in use (block 802) and determining, based on the rate of lubricant consumption and the additional flight range, a volume of additional lubricant required to enable the aircraft to fly a sum of an original flight range and the additional flight range (block 803). The method 800 further includes sizing a secondary lubricant tank to provide the volume of additional lubricant height-wise in between the maximum and minimum lubricant levels of the primary lubricant tank when the secondary lubricant tank is installed on the aircraft (block 804) and installing the secondary lubricant tank on the aircraft such that the secondary lubricant tank provides the volume of additional lubricant at a location that is height-wise in between the maximum and minimum lubricant levels of the primary lubricant tank (block 805). In addition, the method 800 includes fluidly connecting the secondary lubricant tank to the primary lubricant tank such that a level of lubricant in the secondary lubricant tank tracks a level of lubricant in the primary lubricant tank while the level of lubricant in the primary lubricant tank is between the maximum and minimum lubricant levels of the primary lubricant tank during operation of the aircraft (block 806) and structuring the primary and secondary lubricant tanks such that air pressure in the primary and secondary lubricant tanks is substantially the same when the aircraft is stationary on horizontal ground (block 807) by, for example, venting the primary and secondary lubricant tanks to atmosphere (block 8071).

The fluidly connecting of the secondary lubricant tank to the primary lubricant tank of block 806 can include removing a sight glass from a sight glass location of the primary lubricant tank (block 8061) and fluidly connecting the secondary lubricant tank to the primary lubricant tank via the sight glass location (block 8062). Alternatively, the fluidly connecting of the secondary lubricant tank to the primary lubricant tank of block 806 can include fluidly connecting the secondary lubricant tank to the primary lubricant tank via a filler neck of the primary lubricant tank (block 8063).

Technical effects and benefits of the present disclosure are the provision of an external lubricant tank system to allow an aircraft to remain in flight longer that what would otherwise be possible. The external lubricant tank system relies on passively exchanging air and lubricant between the engine lubricant tank and the external lubricant tank, thus removing the need for lubricant pumps.

The corresponding structures, materials, acts and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the technical concepts in the form disclosed. Many modifications and variations will be apparent to those of ordinary skill in the art without departing from the scope and spirit of the disclosure. The embodiments were chosen and described in order to best explain the principles of the disclosure and the practical application and to enable others of ordinary skill in the art to understand the disclosure for various embodiments with various modifications as are suited to the particular use contemplated.

While the preferred embodiments to the disclosure have been described, it will be understood that those skilled in the art, both now and in the future, may make various improvements and enhancements which fall within the scope of the claims which follow. These claims should be construed to maintain the proper protection for the disclosure first described.

What is claimed is:

1. A powerplant of an aircraft, comprising:

a motor;

a primary tank fluidly connected to the motor via a lubrication circuit that is operable to provide lubricant to a part of the motor when the aircraft is in use, the primary tank having pre-defined maximum and minimum lubricant levels;

a secondary tank disposed relative to the primary tank such that a portion of the secondary tank is disposed height-wise between the maximum level and the minimum level of the primary tank when the aircraft is stationary on horizontal terrain;

an air conduit fluidly connecting:

into the primary tank at a location on the primary tank that extends height-wise above the maximum level of the primary tank when the aircraft is stationary on horizontal terrain, and into the secondary tank at a location on the secondary tank that height-wise extends above the maximum level of the primary tank when the aircraft is stationary on horizontal terrain; and a lubricant conduit fluidly connecting:

into the primary tank at a location on the primary tank that height-wise extends below the minimum level of the primary tank when the aircraft is stationary on horizontal terrain, and into the secondary tank at a location on the secondary tank that height-wise extends below the minimum level of the primary tank when the aircraft is stationary on horizontal terrain.

2. The powerplant according to claim 1, wherein the location at which the air conduit connects into the primary tank is one of:

a sight glass location of the primary tank, and a lubricant filler neck location of the primary tank.

3. The powerplant according to claim 2, wherein the location at which the lubricant conduit connects into the primary tank is one of:

the sight glass location of the primary tank, and a drain port location of the primary tank.

4. The powerplant according to claim 1, wherein the location at which the lubricant conduit connects into the primary tank or the secondary tank comprises a “T” fitting.

5. The powerplant according to claim 1, further comprising an air vent in each of the primary and secondary tanks.

6. The powerplant according to claim 5, wherein the air vent includes a connection to atmosphere.

7. The powerplant according to claim 1, wherein the motor includes one of: a gas turbine engine, an electric motor, and a rotary engine.

8. The powerplant according to claim 1, wherein the air conduit and its connections stated in claim 1 are structured to equalize air pressure between the primary and secondary tanks during operation of the aircraft.

9. The powerplant according to claim 8, wherein the lubricant conduit and its connections stated in claim 1 are structured to allow for a rate of flow of lubricant from the secondary tank to the primary tank during operation of the aircraft which is at least equal to a rate of consumption of lubricant by the motor from the primary tank during operation of the aircraft.

10. The powerplant according to claim 1, wherein the primary tank is integrated into a structure of the motor and the secondary tank is mounted to one of: the motor and a nacelle that extends around the motor.

11. The powerplant according to claim 1, wherein:

the aircraft and motor were manufactured for a maximum flight range based on a volume of the primary tank;

an additional flight range was assigned to the aircraft and motor; and the secondary tank is sized based on a rate of consumption of lubricant by the motor from the primary tank during operation of the aircraft, and the additional flight range to enable the aircraft to fly a sum of the maximum flight range and the additional flight range once the primary and secondary tanks are filled with lubricant to the maximum level without adding lubricant to the primary or secondary tank before completing the sum of the maximum flight range and the additional flight range.

12. The powerplant according to claim 11, wherein the secondary tank is sized to enable the aircraft to fly the sum of the maximum flight range and the additional flight range by having had its volume located height-wise between the minimum level and the maximum level sized based on the rate of consumption of lubricant by the motor from the primary tank during operation of the aircraft and the additional flight range.

13. An aircraft motor assembly, comprising:

a nacelle connected to the aircraft motor; and a lubricant system providing the aircraft motor with a desired range and comprising:

a primary tank having maximum and minimum levels and containing, to the maximum level, lubricant for the engine such that the vehicle has a first range;

a secondary tank disposed in space in one of the engine and the nacelle and containing additional lubricant at or below the maximum level and at or above the minimum level; and a fluid connection between the secondary and the primary tanks to maintain substantially equal lubricant levels in the primary and secondary tanks.

14. The aircraft motor assembly according to claim 13, wherein the fluid connection comprises a lubricant conduit and an air conduit.

15. The aircraft motor assembly according to claim 14, wherein the fluid connection includes an air vent in each of the primary and secondary tanks.

16. The aircraft motor assembly according to claim 15, wherein the air vent includes a connection to atmosphere.

17. A method of retrofitting an aircraft to provide the aircraft with an additional flight range, the method comprising:

determining, for a primary lubricant tank of a powerplant of the aircraft, maximum and minimum lubricant levels of the primary lubricant tank;

determining a rate of lubricant consumption of the powerplant when the aircraft is in use;

determining, based on the rate of lubricant consumption and the additional flight range, a volume of additional lubricant required to enable the aircraft to fly a sum of an original flight range and the additional flight range;

sizing a secondary lubricant tank to provide the volume of additional lubricant height-wise in between the maximum and minimum lubricant levels of the primary lubricant tank when the secondary lubricant tank is installed on the aircraft;

installing the secondary lubricant tank on the aircraft such that the secondary lubricant tank provides the volume of additional lubricant at a location that is height-wise in between the maximum and minimum lubricant levels of the primary lubricant tank;

fluidly connecting the secondary lubricant tank to the primary lubricant tank such that a level of lubricant in the secondary lubricant tank tracks a level of lubricant in the primary lubricant tank while the level of lubricant in the primary lubricant tank is between the maximum and minimum lubricant levels of the primary lubricant tank during operation of the aircraft; and structuring the primary and secondary lubricant tanks such that air pressure in the primary and secondary lubricant tanks is substantially the same when the aircraft is stationary on horizontal ground.

18. The method according to claim 17, wherein the fluidly connecting of the secondary lubricant tank to the primary lubricant tank comprises:

removing a sight glass from a sight glass location of the primary lubricant tank, and fluidly connecting the secondary lubricant tank to the primary lubricant tank via the sight glass location.

19. The method according to claim 18, wherein the fluidly connecting of the secondary lubricant tank to the primary lubricant tank comprises fluidly connecting the secondary lubricant tank to the primary lubricant tank via a filler neck of the primary lubricant tank.

20. The method according to claim 17, wherein structuring the primary and secondary lubricant tanks such that air pressure in the primary and secondary lubricant tanks is substantially the same when the aircraft is stationary on horizontal ground comprises venting the primary and secondary lubricant tanks to atmosphere.

* * * * *